(12) United States Patent
Sampath et al.

(10) Patent No.: US 9,084,221 B2
(45) Date of Patent: Jul. 14, 2015

(54) PROTOCOL FOR COMMUNICATION

(75) Inventors: Hemanth Sampath, San Diego, CA (US); Mohammad Hossein Taghavi Nasrabadi, San Diego, CA (US); Santosh P. Abraham, San Diego, CA (US); Sameer Vermani, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1235 days.

(21) Appl. No.: 12/941,681

(22) Filed: Nov. 8, 2010

(65) Prior Publication Data

US 2011/0274056 A1      Nov. 10, 2011

Related U.S. Application Data

(60) Provisional application No. 61/300,863, filed on Feb. 3, 2010.

(51) Int. Cl.
| | |
|---|---|
| *H04W 4/00* | (2009.01) |
| *H04W 74/00* | (2009.01) |
| *H04B 7/06* | (2006.01) |
| *H04B 7/08* | (2006.01) |
| *H04W 74/08* | (2009.01) |
| *H04W 72/04* | (2009.01) |

(52) U.S. Cl.
CPC ........... *H04W 74/002* (2013.01); *H04B 7/0695* (2013.01); *H04B 7/088* (2013.01); *H04W 72/0446* (2013.01); *H04W 74/0833* (2013.01); *H04W 72/042* (2013.01); *H04W 72/0413* (2013.01); *H04W 74/004* (2013.01)

(58) Field of Classification Search
CPC .............................. H04W 72/04; H04W 88/02
USPC .......................................................... 370/329
See application file for complete search history.

(56) References Cited

U.S. PATENT DOCUMENTS

| | | | |
|---|---|---|---|
| 2007/0025383 | A1 | 2/2007 | Katar et al. |
| 2009/0041156 | A1 | 2/2009 | Lakkis |
| 2009/0111532 | A1* | 4/2009 | Salokannel et al. .......... 455/574 |
| 2009/0196203 | A1 | 8/2009 | Taira et al. |
| 2009/0279525 | A1 | 11/2009 | Lakkis |
| 2010/0014463 | A1 | 1/2010 | Nagai et al. |

OTHER PUBLICATIONS

Harada H., et al., "Merged proposal: New PHY Layer and Enhancement of MAC for mmWaveSystem Proposal", IEEE 802.15-07-0934-01-003c, 89 pp, IEEE mentor, Nov. 13, 2007.
Junyi W., et al., "MAC Layer Beamforming Protocol for 60GHz WPANs," Technical Report of the Institute of Electronics, Information and Communication Engineers, RCS, Wireless Communication System, The Institute of Electronics, Information and Communication Engineers, Aug. 20, 2008, 108(188), pp. 263-268.
Lakkis, et al., "IEEE 802.15.3c Beamforming Overview", IEEE 802.11-09/0355r0, IEEE mentor, Mar. 12, 2009, XP002595240.

(Continued)

*Primary Examiner* — Shripal Khajuria
(74) *Attorney, Agent, or Firm* — Steven R. Thiel (57) ABSTRACT

Various methods and apparatuses for transmitting an allocation of time in a wireless communication system are disclosed. In one aspect, allocations of time for receiving and transmitting control communications are determined. The control communications may comprise a channel time request.

38 Claims, 9 Drawing Sheets

(56) References Cited

OTHER PUBLICATIONS

Taiwan Search Report—TW100104183—TIPO—Sep. 9, 2013.
IEEE Standard for Information technology—Telecommunications and information exchange between systems—Local and metropolitan area networks—Specific requirements. Part 15.3: Wireless Medium Access Control (MAC) and Physical Layer (PHY) Specifications for High Rate Wireless Personal Area Networks, IEEE Standard, IEEE, Piscataway, NJ, USA, Oct. 12, 2009, pp. C1-187, XP017604237, ISBN: 978-0-7381-6050-4.
"IEEE Standard for Information Technology—Telecommunications and Information Exchange Between Systems—Local and Metropolitan Area Networks—Specific Requirements Part 15.3: Wireless Medium Access Control (MAC) and Physical Layer (PHY) Specifications for High Rate Wireless Personal Area Networks", IEEE Standard; [IEEE Standard], IEEE, Piscataway, NJ, USA, Jan. 1, 2003, pp. 1-315, XP017603623.
International Search Report and Written Opinion—PCT/US2011/023640—ISA/EPO—May 4, 2011.

* cited by examiner

PROTOCOL FOR COMMUNICATION

CROSS-REFERENCE TO RELATED APPLICATIONS

This application claims priority under 35 U.S.C. §119(e) to U.S. Provisional Application No. 61/300,863, filed Feb. 3, 2010, which is hereby incorporated by reference in its entirety.

BACKGROUND

1. Field

The present disclosure relates generally to communication systems, and more particularly, to allocation of communication resources.

2. Introduction

In order to address the issue of increasing bandwidth requirements that are demanded for wireless communications systems, different schemes are being developed to allow communication over one or more channels while achieving high data throughputs. These schemes may include protocols for transmission or reception of data and control information, forms of signal modulation, or utilization a physical (PHY) layer Medium Access Control (MAC) layer.

SUMMARY

The systems, methods, apparatuses, and computer-readable mediums of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one of ordinary skill in the art will appreciate how the features of this invention provide protocols for communication.

One aspect is a method of communication comprising allocating, by a first apparatus, a first contention free time period to a second apparatus and receiving, by the first apparatus, during the first contention free time period, a first control communication from the second apparatus, wherein the first control communication comprises a channel time request.

Another aspect is a first apparatus for communication comprising a processing system configured to allocate a first contention free time period to a second apparatus and a receiver configured to receive, during the first contention free time period, a first control communication from the second apparatus, wherein the first control communication comprises a channel time request.

Another aspect is a first apparatus for communication comprising means for allocating a first contention free time period to a second apparatus and means for receiving, during the first contention free time period, a control communication from the second apparatus, wherein the first control communication comprises a channel time request.

Another aspect is a computer program product for communication comprising a computer readable medium comprising instructions that when executed cause a first apparatus to allocate a first contention free time period to a second apparatus and receive, during the first contention free time period, a first control communication from the second apparatus, wherein the control communication comprises a channel time request.

Another aspect is an access point comprising a processing system configured to allocate a first contention free time period to an apparatus, at least one antenna, and a receiver configured to receive, via the at least one antenna and during the first contention free time period, a first control communication from the apparatus, wherein the control communication comprises a channel time request.

Another aspect is a method of communication comprising receiving, by a first apparatus from a second apparatus, an allocation communication comprising an indication of a first contention free time period and transmitting, by the first apparatus, during the first contention free time period, a first control communication to the second apparatus, wherein the first control communication comprises a channel time request.

Another aspect is a first apparatus for communication comprising a receiver configured to receive an allocation communication from a second apparatus comprising an indication of a first contention free time period and a transmitter configured to transmit, during the first contention free time period, a first control communication to the second apparatus, wherein the first control communication comprises a channel time request.

Another aspect is a first apparatus for communication comprising means for receiving an allocation communication from a second apparatus comprising an indication of a first contention free time period and means for transmitting, during the first contention free time period, a first control communication to the second apparatus, wherein the first control communication comprises a channel time request.

Another aspect is a computer program product for communication comprising a computer readable medium comprising instructions that when executed cause a first apparatus to receive, from a second apparatus, an allocation communication comprising an indication of a first contention free time period and transmit, during the first contention free time period, a first control communication to the second apparatus, wherein the first control communication comprises a channel time request.

Another aspect is a mobile phone comprising at least one antenna, a receiver configured to receive, via the at least one antenna, an allocation communication comprising an indication of a first contention free time period, and a transmitter configured to transmit, via the at least one antenna and during the first contention free time period, a first control communication to an apparatus, wherein the first control communication comprises a channel time request.

BRIEF DESCRIPTION OF THE DRAWINGS

These and other sample aspects of the invention will be described in the detailed description that follow, and in the accompanying drawings.

Some of the drawings may be simplified for clarity. Thus, the drawings may not depict all of the components of a given apparatus, device, system, method, or any other illustrated component or process. Like reference numerals may be used to denote like features throughout the specification and figures.

DETAILED DESCRIPTION

Various aspects of methods, systems, and apparatuses are described more fully hereinafter with reference to the accompanying drawings. These methods, systems, and apparatuses may, however, be embodied in many different forms and should not be construed as limited to any specific structure or function presented throughout this disclosure. Rather, these aspects are provided so that this disclosure will be thorough and complete, and will fully convey the scope of these methods, systems, and apparatuses to those skilled in the art. Based on the descriptions herein teachings herein one skilled in the art should appreciate that the scope of the disclosure is intended to cover any aspect of the methods, systems, and apparatuses disclosed herein, whether implemented independently of or combined with any other aspect of the disclosure. For example, a system or apparatus may be implemented or a method may be practiced using any number of the aspects set forth herein. In addition, the scope of the disclosure is intended to cover such an apparatus, system, or method which is practiced using other structure, functionality, or structure and functionality in addition to or other than the various aspects of the disclosure set forth herein. It should be understood that any aspect of the disclosure herein may be embodied by one or more elements of a claim.

In some aspects, a wireless communications system described herein may comprise a wireless area network. For example, the system may comprise a wireless local area network (WLAN) or a wireless personal area network (WPAN). A WLAN may be implemented according to one or more existing or developing standards, for example the Institute of Electrical Engineers (IEEE) 802.11 standard. The IEEE 802.11 standard denotes a set of WLAN air interface standards developed by the IEEE 802.11. For example, systems described herein may be implemented according to any one of the 802.11ad, 802.11ac, 802.11a, 802.11b, 802.11g, and 802.11n standards. Similarly, a WPAN may be implemented according to one or more of the IEEE standards, for example the IEEE 802.15 standard. The IEEE 802.15 standard denotes a set of WPAN air interface standards developed by the IEEE committee. For example, systems described herein may be implemented according to any one of the 802.11ad, 802.15.3b, 802.15.3c, 802.15.4a, 802.15.4b, and 802.15.4c standards. Such area networks may support Multiple Input or Multiple Output (MIMO) technology. In addition, the systems described herein may be implemented according to a Bluetooth standard.

Those of skill in the art will recognize that although the system described herein may be implemented according to one or more of the above standards, the system described herein is not limited to such implementations. In addition, those of skill in the art will recognize that while a system may be described as implementing one of these standards, devices present in the system may additionally or alternatively implement another standard. In this situation, it may be beneficial to account for devices that use such other standard in selecting the features of the system. For example, the system may not be configured to receive communications from the other devices, although it may be beneficial for the system to account for such communications from the other devices. In some aspects, the communications from the other devices may interfere with system messages unless select transmit and receive schemes are implemented.

In some aspects, for example in systems implemented according to the 802.11ad or 802.15.3c standards, the PHY layer may be used for millimeter wave (e.g., with carrier frequency of approximately 60 GHz) communications. For example, the system may be configured for millimeter wave communications in the 57 GHz-66 GHz spectrum (e.g., 57 GHz-64 GHz in the United States, and 59 GHz-66 GHz in Japan). Such implementations are particularly beneficial for use with short-range communications (e.g., several meters to tens of meters). For example, the system may be configured to operate within a conference room and to provide wireless communication capabilities between devices located within the conference room.

Systems utilizing a millimeter wave generally may have a central entity, such as an access point (AP)/point coordination function (PCF) that manages communications between different devices, also called stations (STAs). Having a central entity may simplify design of communication protocols. In some aspects, there may be a dedicated or predetermined AP. In other systems, a plurality of devices may perform functions of the AP. In some aspects, any device may used as an AP, or performing AP functionality may rotate between different devices. Those of skill in the art will recognize that in many aspects, a STA may be used as an AP. In some aspects, there may be a dedicated or predetermined AP, or a STA may be used to implement AP functionality, or there may be a dedicated or predetermined AP in combination with one or more STAs performing AP functionality.

An AP may comprise, be implemented as, or be referred to as a base station, a base transceiver station, a station, a terminal, a node, an access terminal acting as an access point, a WLAN device, a WPAN device, or some other suitable terminology. An access point ("AP") may also comprise, be implemented as, or be referred to as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A STA may comprise, be implemented as, or be referred to as an access terminal, a user terminal, a mobile station, a subscriber station, a station, a wireless device, a terminal, a node, or some other suitable terminology. An STA may be also comprise, be implemented as, or be referred to as a remote station, a remote terminal, a user agent, a user device, user equipment, or some other terminology.

In some aspects, an STA may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

Although particular aspects are described herein, many variations and permutations of these aspects fall within the scope the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description, and drawings that will hereinafter be described, are merely illustrative of the disclosure rather than limiting.

Figure 1:
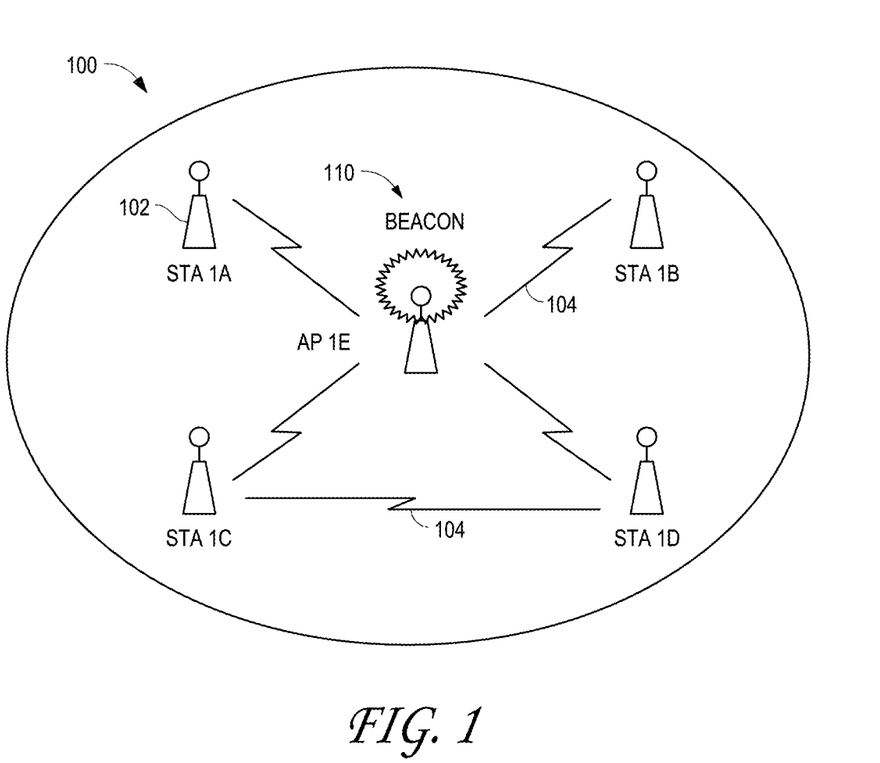
FIG. 1 illustrates a block diagram of a communication system according to an aspect.

FIG. 1 illustrates an aspect of a wireless communication system 100. As illustrated, the system 100 may include a number of wireless nodes 102 that can communicate with one another using wireless links 104, for example over a PHY layer using waves having a frequency of approximately 60 GHz, as described above. In the illustrated aspect, the wireless nodes 102 include four stations STA 1A-STA 1D, and an access point AP 1E. Although the system 100 is illustrated with five wireless nodes 102, it should be appreciated that any number of nodes, wired or wireless, may form the wireless communication system 100.

Each of the nodes 102 in the system 100 may include, among other things, a wireless transceiver to support wireless communication and controller functionality to manage communication over the network. The controller functionality may be implemented within one or more digital processing devices. The wireless transceiver may be coupled to one or more antennas to facilitate the transmission and reception of signals over a wireless channel. Any type of antennas may be used including, for example, dipoles, patches, helical antennas, antenna arrays, and/or others.

As illustrated, the AP 1E may transmit a beacon signal 110 (or simply a "beacon") to other nodes of the system 100, which may help the other nodes STA 1A-STA 1D to synchronize their timing with the AP 1E, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In the system 100, the STAs 1A-1D may be distributed throughout a geographic region in such a manner that each STA 1A-1D may not be able to communicate with every other STA 1A-1D. Further, each STA 1A-1D may have a different coverage region over which it may communicate. In some aspects, a peer-to-peer network may be established between two or more of the STAs 1A-1D.

In some aspects, an STA may be required to associate with the AP in order to send communications to and/or receive communications from the AP. In one aspect, information for associating is included in a beacon broadcast by the AP. To receive such beacon, the STA may perform a broad coverage search over a coverage region, for example. A search may also be performed by the STA by sweeping a coverage region in a lighthouse fashion, for example. After receiving the information for associating, the STA may transmit a reference signal, such as an association probe or request, to the AP. In some aspects, the AP may use backhaul services, for example, to communicate with a larger network, such as the Internet or a public switched telephone network (PSTN).

Figure 2:
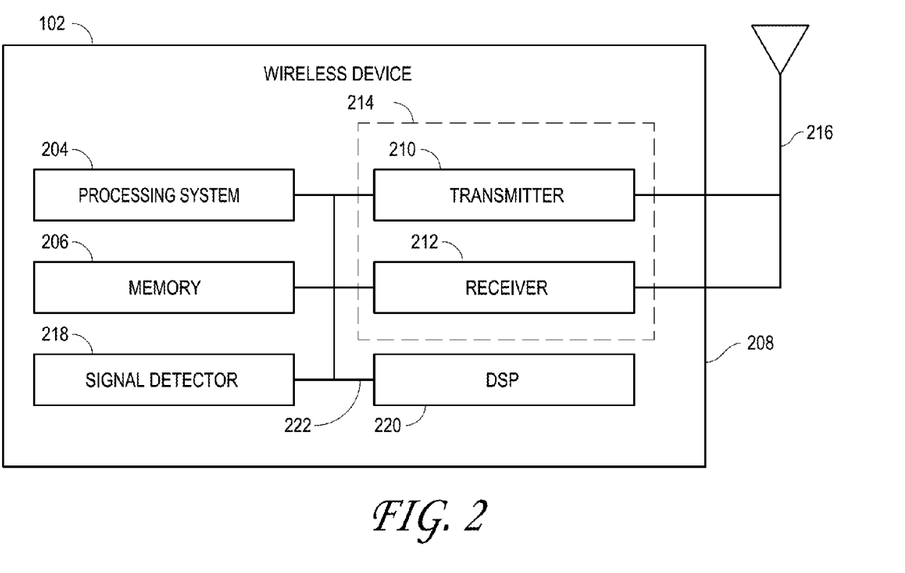
FIG. 2 illustrates an aspect of a wireless node for use in the communication system illustrated in FIG. 1.

FIG. 2 illustrates an aspect of the wireless node 102 that may be employed within the wireless communication system 100. For example, one or more of the STAs 1A-1D or the AP 1E may be implemented as described with respect to FIG. 2. The wireless node 102 is an aspect of a device that may be configured to implement various methods described herein. The wireless node 102 may be enclosed within a housing 208, or the components of the wireless node 102 may be otherwise supported or grouped together by another structure. In some aspects, the housing 208 or other structure is omitted.

The wireless node 102 may include a processing system 204 which controls operation of the wireless node 102. The processing system 204 may in some aspects be referred to as a central processing unit (CPU). In some aspects, the processing system 204 may comprise or be implemented with a circuit configured to perform at least the functions of the processing system 204. Memory 206, which may include both read-only memory (ROM) and random access memory (RAM) and may be volatile or permanent, may provide instructions and data to the processing system 204. A portion of the memory 206 may also include non-volatile random access memory (NVRAM). The processing system 204 typically performs logical and arithmetic operations based on program instructions stored within the memory 206, but may of course perform other operations. The instructions in the memory 206 may be executable to implement the methods described herein. Additionally, the node 102 may be configured to accept another type of computer readable medium, such as a disk or form of memory card, or may be connected to a computer readable medium, such as a hard drive, which may comprise instructions that when executed cause the node 102 to execute a method or process described herein.

The wireless node 102 may also include a transmitter 210 and a receiver 212 to allow transmission and reception of communications between the wireless node 102 and a remote location. Those of skill in the art will recognize that the transmitter 210 and receiver 212 may be combined into a transceiver 214. An antenna 216 may be attached to the housing 208 and electrically coupled to the transceiver 214. The wireless node 102 may also include (not shown) multiple transmitters, multiple receivers, multiple transceivers, and/or multiple antennas.

Multiple antennas at the wireless node 102 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal. In addition, multiple antennas may enable increased ability to implement beamforming or a plurality of communication beam patterns. In some aspects, one or more antennas are steerable.

The wireless node 102 may also include a signal detector 218 that may be used in an effort to detect and quantify the level of signals received by the transceiver 214. The signal detector 218 may detect such signals as total energy, energy per subcarrier per symbol, power spectral density, and other signals. The wireless node 102 may also include a digital signal processor (DSP) 220 for use in processing signals. Of course, the DSP 220 may be omitted in some aspects, or the functions of the DSP may be performed by the processing system 204.

The various components of the wireless node 102 may be coupled together by a bus system 222, which may include a power bus, a control signal bus, and a status signal bus in addition to a data bus. Of course, the components may be coupled or electrically connected in other ways or using other means as well.

As described above, either an STA, an AP, or both may be implemented according the description of the wireless node 102 above. In some aspects, any device capable of transmitting a beacon signal may serve as an AP. In some aspects, however, in order for an AP to be effective it may have to have a good link quality to all STAs in a network. At high frequencies, where signal attenuation may be relatively severe, communications may be directional in nature and may use beamforming (e.g. beam training) to increase gains. As such, an effective AP may beneficially have a large sector bound (e.g. a wide steering capability). The AP may have a large beamforming gain (which may be provided, for example, by multiple antennas), may be mounted so that a line of sight path exists to most areas served by the wireless system 100, and/or may use a steady power supply for periodic beacon transmissions and other management functions. Even if a device has an antenna steering capability that may be limited to a small sector bound, an available power that may be limited, and/or a location that may be variable, however, the device may in some aspects perform as an AP, for example when forming peer-to-peer networks. Peer-to-peer networks may be used for a variety of purposes, such as side-loading, file sharing, and other purposes. In some aspects, a peer-to-peer network may be created where no device may efficiently transmit to and receive from all other devices.

In some aspects, the wireless node 102 is equipped with multi-mode radios with different frequency transceivers, for example a 60 GHz transceiver, a 2.4 GHz transceiver, a 5 GHz transceiver, etc. In some implementations, lower frequency communications may be performed omni-directionally and higher frequency communications may be performed directionally. Such aspects may be advantageous in a network to where an omni-directional protocol may be used to locate and set up further communications and where the further communications use a directional protocol.

FIGS. 3A-3D illustrates aspects of beamforming. As described above, the wireless node 102 may be configured to implement one or more types of beamforming, for example using the antenna 216 or a plurality of antennas. Although the beamforming will be described below with respect to an AP, those of skill in the art will appreciate that an STA as described above may implement such beamforming. Those of skill in the art will additionally appreciate that the beamforming described below may refer to signals being transmitted, as well as to a beam or direction in which signals are received. Further, those of skill in the art will appreciate that an AP may implement different beamforming for receiving as for transmitting, and/or may dynamically adjust any such beamforming. The beamforming may also be predetermined.

Figure 3A:
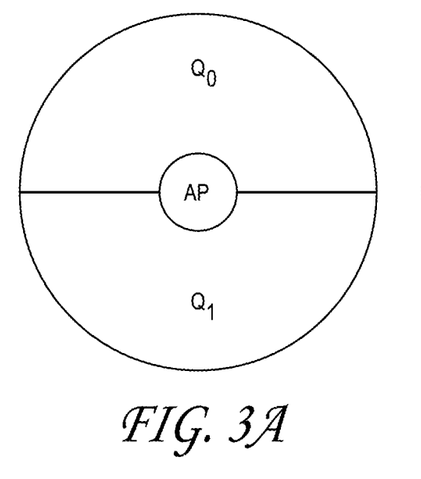
FIGS. 3A-3D illustrate aspects of beamforming for use in the communication system illustrated in FIG. 1.

The term quasi-omni pattern generally relates to the lowest resolution pattern that covers a very broad area of a region of space of interest around a device. An AP, for example as illustrated by AP 1E in FIG. 1 or as implemented as illustrated in FIG. 2, may cover the region of space of interest in a minimal set of, possibly overlapping, quasi-omni patterns. A set size equal to one may indicate that the AP is able to cover the spatial region of interest with only one quasi-omni pattern, indicating that the AP is omni-capable. The quasi-omni transmit and receive patterns may be identified by $Q_n$, where n represents a respective direction. Those of skill in the art will appreciate that the beams may be overlapping, and that each direction denoted by a separate n need not be distinct. A beam pattern having two approximately equal patterns is illustrated in FIG. 3A. In this aspect, n=2.

Of course, beams having a narrower azimuth than described with respect to the quasi-omni pattern may be used. Such narrower beams may be advantageous because each beam may be characterized by a greater gain and increased signal to noise ratio (SNR) as compared to the beams used in the quasi-omni pattern. This is particularly advantageous in systems which experience high signal fading or decay.

Figure 3B:
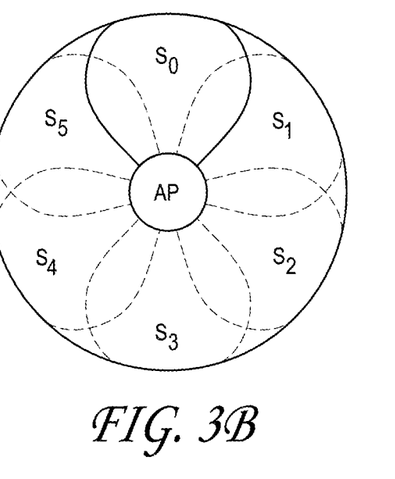

FIG. 3B illustrates an aspect of beamforming where the azimuth is narrower than described with respect to the quasi-omni pattern. The transmit and receive patterns are identified by $S_0$-$S_5$. As can be seen in FIG. 3B, the beams formed by the AP may overlap. Of course, the beam pattern may comprise beams which do not overlap. As described above, the AP may be configured to change a direction in which the beam is pointing. Thus, the AP in FIG. 3B may first send and/or receive communications via beam $S_1$, then via beam $S_2$, etc. The AP can, but need not, change directions so as to point the beam in successive directions to form a complete circle (i.e. pointing in directions 0-5 in order, then starting again at 0). The AP may instead change directions in any order, or may randomly select a direction in which to point.

Figure 3C:
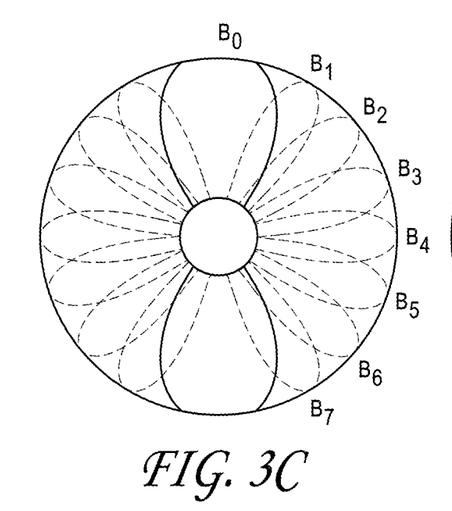
Figure 3D:
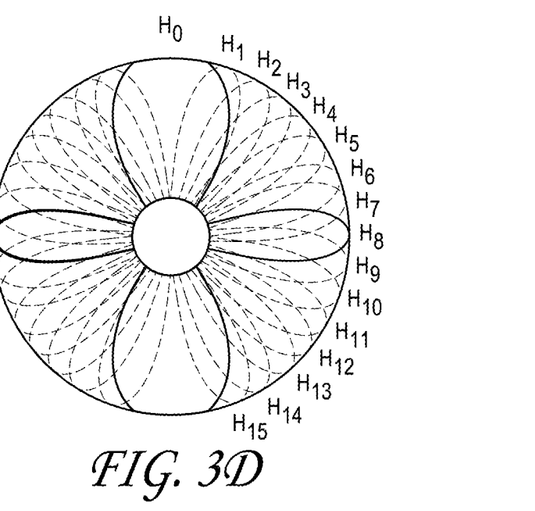

FIGS. 3C and 3D illustrate aspects having even narrower beams. FIG. 3C shows a beam pattern having 16 directions $B_0$-$B_{15}$ (only half of these directions, $B_0$-$B_7$, are numbered in the illustration), and FIG. 3D shows a beam pattern having 32 directions $H_0$-$H_{31}$ (only half of these directions, $H_0$-$H_{15}$, are numbered in the illustration). Narrower beams may provide the advantages discussed above, but may also require additional overhead information, or may require additional time for changing the direction of the beam. Thus, when selecting a number of beams to use, the requisite overhead may need to be considered. Although the beams are illustrated as being substantially symmetric, the beam shapes, sizes, and/or distribution may vary.

The term sector may generally be used to refer to a second level resolution pattern that covers a relatively broad area of multiple beams. A sector can cover a set of consecutive and nonconsecutive beams and different sectors can overlap. Beams can be further divided into high-resolution (HRS) beams as a high level of resolution pattern.

The multi-resolution definition of quasi-omni patterns, sectors, beams and HRS beams may become a multi-level definition, where each level may use a set of antenna patterns. Therefore, quasi-omni patterns may represent a first set of antenna patterns, sectors may represent a second set of antenna patterns, beams may represent a third set of antenna patterns preferably derived from the second set of antenna patterns, and HRS beams may represent a fourth level of antenna patterns preferably derived from the third set of antenna patterns.

Figure 4:
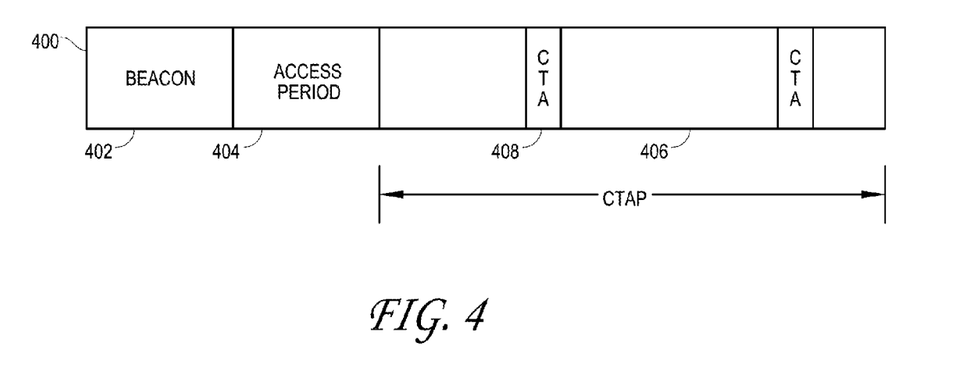
FIG. 4 illustrates an aspect of a superframe structure.

FIG. 4 illustrates an aspect of a superframe structure, as previously described above. The superframe 400 may comprise a beacon interval 402, an access period 404, and a channel time allocation period (CTAP) 406. The CTAP 406 may comprise multiple channel time allocations (CTAs) 408.

In some aspects, the described apparatuses and methods relate to the allocation of time in the access period 404. Advantageously, the present aspects reduce the amount of overhead used for exchanging control communications in a highly directional communication system, such as the system 100, described above. In one aspect, time slots are allocated to one or more apparatuses, such as the stations 102, during which the apparatuses may send and receive control messages with an apparatus, such as the access point 110. In one example, the control messages are channel time request (REQ) messages and REQ Grant messages. As described in greater detail below, by allocating time slots to the apparatuses, overhead associated with sensing and transmitting via unused beam directions can be eliminated.

Figure 5:
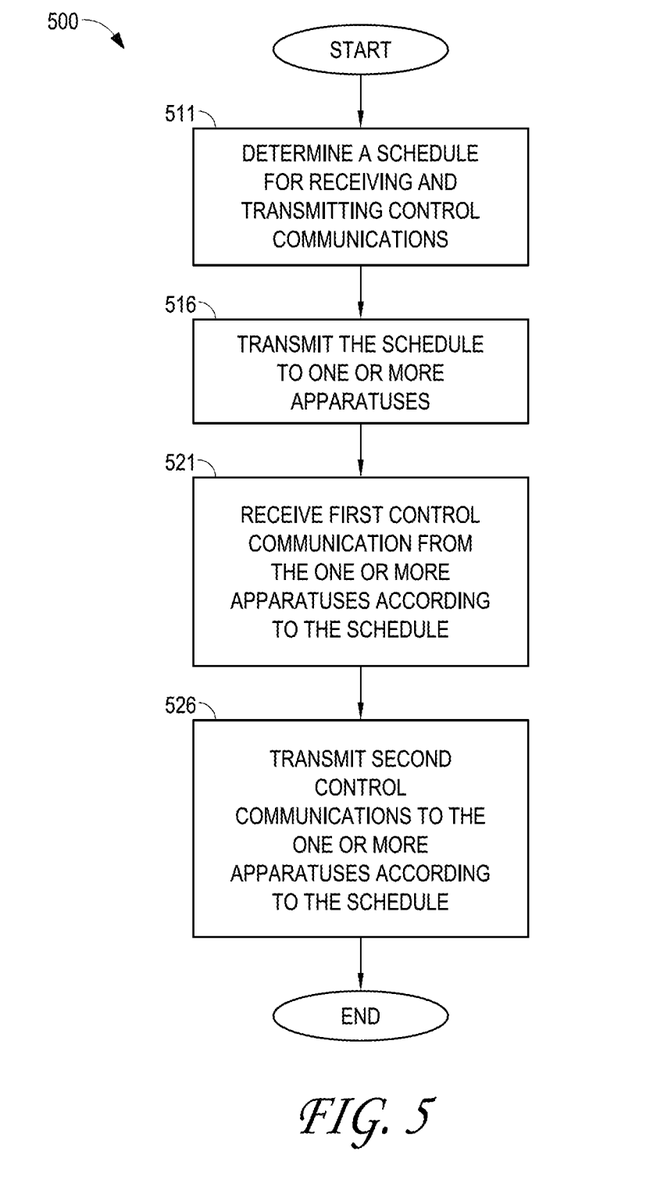
FIG. 5 illustrates a flowchart of an aspect of a method for use in the communication system illustrated in FIG. 1.

FIG. 5 illustrates a flowchart of an aspect of a method 500 for use in the communication system illustrated in FIG. 1. In one aspect, the method 500 is implemented by an access point such as the access point 1E of FIG. 1. The method 500 may be implemented using one or more of the components illustrated in FIG. 2. At block 511, the access point 1E determines a schedule for receiving and transmitting control communications. As described above, a superframe 400 for use in a communication system may define an access period 404 during which certain control communications can be transmitted and received by one or more of the participants in the network system. In one aspect, the access point 1E determines a schedule for organizing the transmission and reception of these control communications during the access period 404. For example, the access point 1E may subdivide the access period 404 into one or more time slots. This subdivision is described in greater detail below with respect to FIG. 7. The access point 1E may then allocate one or more time slot to one or more network participants. In one aspect, time slots are allocated for communication from the access point 1E to a particular station, such as the station 1A. Time slots may also be allocated for communication from the particular station, such as the station 1A, to the access point 1E. In another aspect, a single time slot may be allocated for communication in both directions. In another aspect, one or more time slots may be reserved for devices which have not yet joined the communication system. The schedule may comprise an indication of the number and length of the time slots. The schedule may further comprise an indication of which station, if any, is permitted to transmit or receive control communications during each time slot. In one particular aspect, the access point 1E may allocate a first time slot in the access period 404 to a first station, such as the station 1A, to transmit a control communication, such as a channel time request message. The access point may also allocate a second time slot in the access period 404 to the station 1A to receive a second control communication such as a channel time grant message.

At block 516, the access point transmits the schedule to one or more apparatuses, such as the stations 1A-1D. In one aspect, the schedule is transmitted as part of the beacon 110, 402. In this manner, each of the stations 1A-1D can receive the schedule and determine which time slots, if any, are allocated to each of the stations 1A-1D for transmitting and receiving control communications. For example, station 1A may determine that a first particular time slot is allocated for sending a control communication to the access point 1E and a second particular time slot is allocated for receiving a second control communication from the access point 1E. The time slots allocated to two different stations may be the same, overlapping, or different. In one aspect, additional stations, not shown above, which have not yet joined the communication system also receive the beacon 110, 402 and the schedule included therein. In this aspect, these additional stations may be able to determine one or more time slots allocated for stations desiring to join the communication system.

At block 521, the access point 1E receives first control communications from the one or more apparatuses, such as the stations 1A-1D, according to the schedule. For example, during a first time slot allocated for receiving control communications from station 1A, the access point 1E receives a control communication, such as a channel time request, from the station 1A. Similarly, during another time slot allocated for receiving control communications from station 1B, the access point 1E may receive a separate control communication, such as a separate channel time request, from station 1B. Further, as described above, during a third time slot allocated for use by an apparatus that has not yet joined the communication system, the access point 1E may receive a control communication, such as an access request, from the apparatus. In one aspect, the control communications may be received using one or more beam directions. The control communications received from different stations may be encoded using different Golay codes or spread using different spreading sequences.

In one aspect, the control communications received from the stations 1A-1D during the allocated time slots comprise an indication of a beam direction. As described above, the communication system 100 may be highly directional. Thus, successful reception and transmission of communications may depend on the beam directions used when transmitting and receiving communications. By including a beam direction in the control communication from the stations to the access point, the overhead associated with detecting and transmitting in unused directions can be reduced. This advantageously frees up time in the superframes to be used for other purposes such as increasing data transmission bandwidth. For example, station 1A may include an indication of a beam direction such as beam direction H2 of FIG. 3D. In one aspect, this beam direction indication may be based upon communications previously received by the station 1A. For example, the station 1A may determine that communications received using the beam direction H2 have a better signal to noise ratio or other beneficial characteristic when compared to other beam directions. Thus, beam direction H2 may comprise a preferred beam direction for station 1A. In another aspect, the beam direction indication may comprise an indication of more than one beam direction. As described below, the access point 1E may use the beam direction indication to reduce overhead in the communication system.

At block 526, the access point 1E transmits second control communications to the one or more apparatuses according to the schedule. For example, during a time slot allocated for transmitting control communications to station 1A, the access point 1E transmits a second control communication, such as a channel time grant, to the station 1A. Similarly, during a time slot allocated for transmitting control communications to station 1B, the access point 1E, may transmit a separate second control communication, such as a separate channel time grant, to station 1B. Further, as described above, during a third time slot allocated for use by an apparatus that has not yet joined the communication system, the access point 1E may transmit a second control communication, such as an access grant message, to the apparatus.

In one aspect, the control communications sent to the stations 1A-1D during the allocated time slots are sent via the beam directions indicated in the control communications received from the respective stations. Thus, for example, if the control communication received from station 1A comprises an indication of beam direction H2, the control communication sent from the access point 1E to the station 1A may be sent using beam direction H2. By using the identified beam direction, the access point 1A frees up time in the superframes for other uses, such as increasing data transmission bandwidth, rather than using the time to send the control communications using other beam directions.

Figure 6:
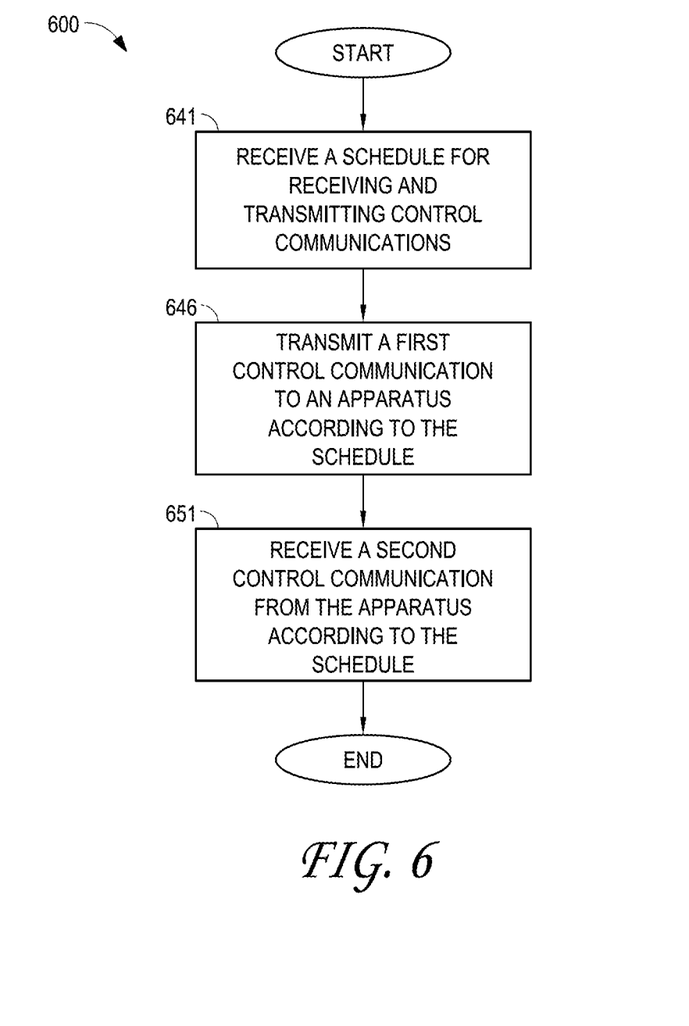
FIG. 6 illustrates a flowchart of an aspect of another method for use in the communication system illustrated in FIG. 1.

FIG. 6 illustrates a flowchart of an aspect of another method 600 for use in the communication system illustrated in FIG. 1. In one aspect, the method 600 is implemented by an access station such as the stations 1A-1D of FIG. 1. The method 600 may be implemented using one or more of the components illustrated in FIG. 2. At block 641, the station, such as station 1A, receives a schedule for receiving and transmitting control communications. As described above, the schedule may indicate that an access period has been subdivided into one or more time slots. Each period may be assigned to an individual station, such as the station 1A, and may be allocated for either receiving or transmitting control communications. For example, a first time slot may be allocated to station 1A for transmitting a control communication, such as a channel time request, to the access point 1E. Further, a second time slot may be allocated to the station 1A for receiving a second control communication, such as a channel time grant, from the access point 1E.

At block 646, the station 1A transmits a first control communication to an apparatus, such as the access point 1E, according to the schedule. For example, the station 1A may transmit a control communication to the access point 1E during a first allocated time slot. In one aspect, as described above, the control communication may comprise an indication of a beam direction. In another aspect, the control communication may be transmitted using one or more beam directions.

At block 651, the station 1A receives a second control communication from the apparatus, such as the access point 1E, according to the schedule. For example, the station 1A may receive a second control communication from the access point 1E during a second allocated time slot. In one aspect, as described above aspect, the control communication may be received according to the beam direction indicated in the first communications message. By using the indicated beam direction, the access point 1A frees up time in the superframes for other uses, such as increasing data transmission bandwidth, rather than using the time to send the control communications using other beam directions.

Figure 7:
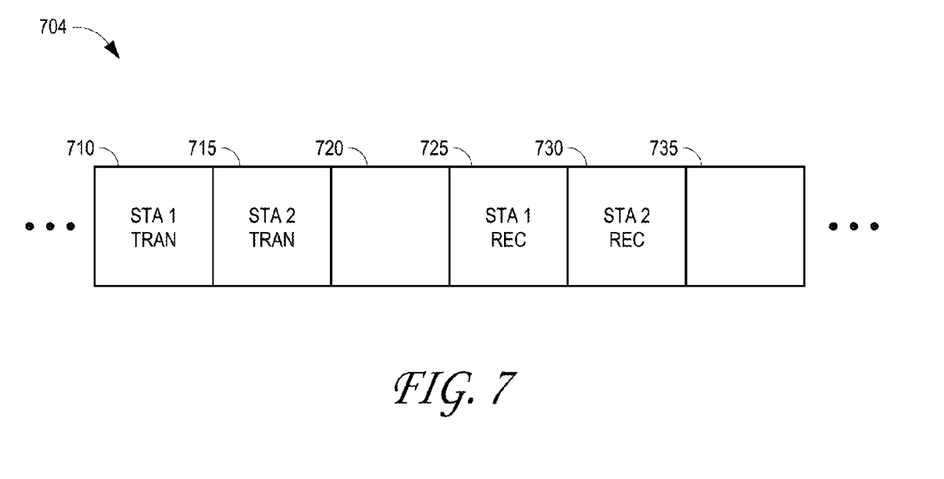
FIG. 7 illustrates a block diagram of an aspect of a schedule for use in the communication system illustrated in FIG. 1.

FIG. 7 illustrates a block diagram of an aspect of a schedule 704 for use in the communication system illustrated in FIG. 1. Schedule 704 illustrates a portion of the access period 404 of FIG. 4. As shown, the schedule 704 comprises a number of time slots 710, 715, 720, 725, 730, 735. Time slot 710 comprises a time slot that has been reserved for a particular station, such as the station 1A, for transmitting a control message, such as a channel time request, to the access point, such as the access point 1E. Time slot 715 comprises a time slot that has been reserved for a particular station, such as the station 1B, for transmitting a control message to the access point, such as the access point 1E. Time slot 720 comprises a time slot that has not been allocated to a particular station. As described above, this time slot 720 may be used by one or more stations that have not yet joined the communication system to send or receive messages such as association messages. In some aspects, the allocated time slots are dedicated, contention free time slots. However, in another aspect, the time slot for which no station has been identified may be used as a contention based access time period. In another aspect, the time slot 720 could be used by the access point 1E to communicate to one or more stations.

Time slot 725 comprises a time slot that has been reserved for a particular station, such as the station 1A, for receiving a second control message, such as a channel time grant, from the access point, such as the access point 1E. Time slot 730 comprises a time slot that has been reserved for a particular station, such as the station 1B, for receiving a second control message from the access point, such as the access point 1E. Time slot 735 comprises a time slot that has not been allocated to a particular station. Time slot 735 may be used in a manner similar to time slot 720 described above.

In another aspect, the time slots, such as the time slots 710 and 715, may have either a predetermined, fixed length or may have a dynamically determined length. The length of a particular time slot may be determined by the access point 1E based upon previous communications with the one or more stations, channel conditions, traffic usage, or other indications. In another aspect, time slots, such as the time slots 710 and 715, may be allocated in the channel time access period 406 in addition to the access period 404.

Figure 8:
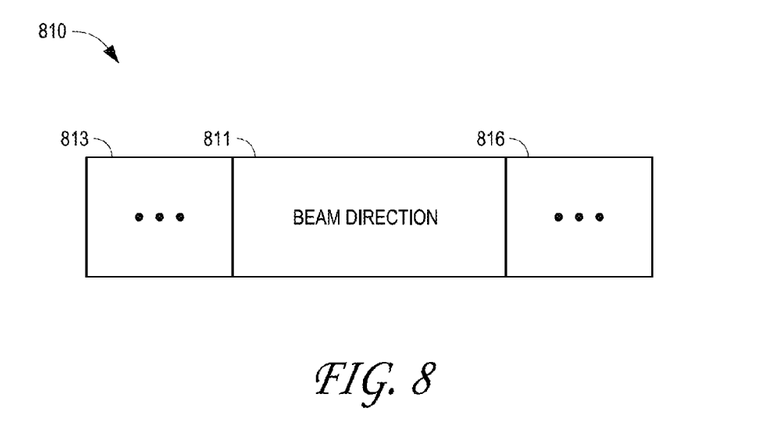
FIG. 8 illustrates a block diagram of an aspect of a control communication for use in the communication system illustrated in FIG. 1.

FIG. 8 illustrates a block diagram of an aspect of a control communication 810 for use in the communication system illustrated in FIG. 1. In one aspect, the control communication 810 comprises a channel time request. As illustrated, the control communication 810 may comprise a plurality of fields, such as fields 813, 811, and 816, containing various types of information. In one aspect, the control communication comprises a field 811 that comprises a beam direction indication. As described above, the access point 1E may transmit communications via one or more beam directions. The beam direction indication may comprise one or more beam directions which facilitate improved communication with a particular station, such as the station 1A. For example, the beam direction indication may comprise an indication that, for station 1A, beam direction H2 is preferred. In this manner the access point 1E can communicate with the station 1A using the preferred beam direction rather than using time transmitting the communication using other, less preferred, beam directions. Other fields of the control communication may comprise other information. This information may include, for example, a channel time request, a channel time grant, a channel time allocation, a channel quality indicator, a payload indicator, and a traffic load indicator.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The processing system, or any part of the processing system, may provide the means for performing the functions recited herein. For example, the processing system executing code may provide the means for allocating a contention free time period to an apparatus. Alternatively, the code on the computer-readable medium may provide the means for performing the functions recited herein. The receiver may provide the means for receiving, during one or more allocated time periods, a control communication from a respective one or more of the apparatuses, each respective control communication comprising a channel time request. The receiver may also comprise the means for receiving a communication comprising an indication of an allocated time period. The transmitter may provide the means for transmitting, during the allocated time period, a control communication to an apparatus, the control communication comprising a channel time request.

Figure 9:
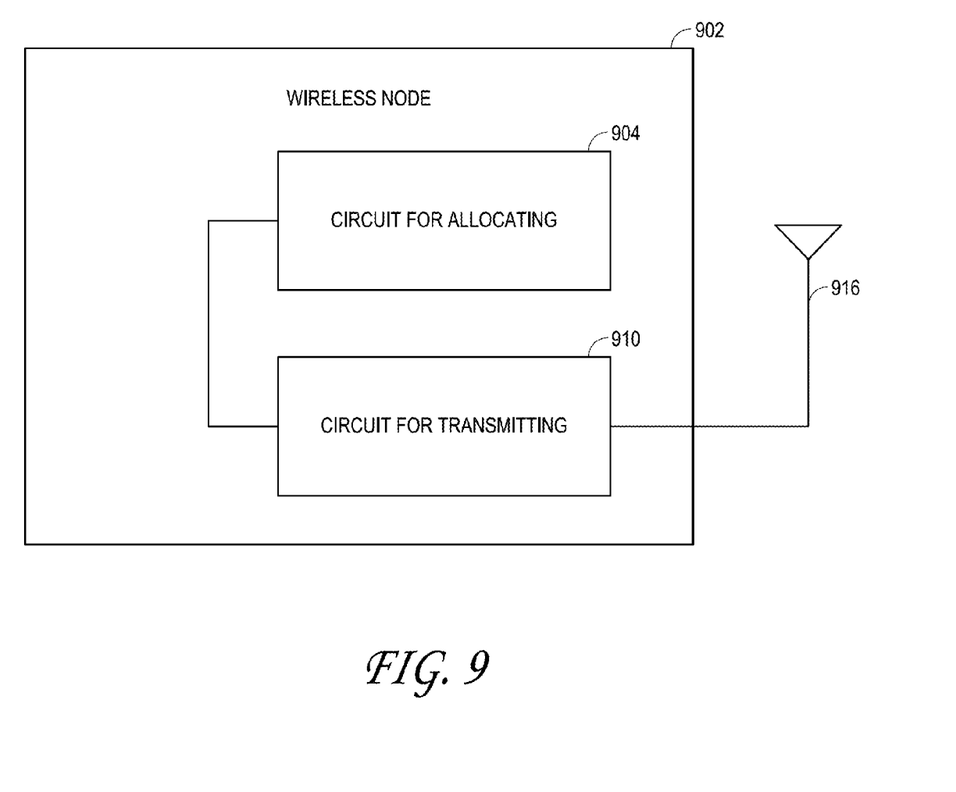
FIG. 9 illustrates an aspect of an apparatus for use in the communication system illustrated in FIG. 1.

In some aspects, one or more of the functions recited herein are implemented in a circuit configured to perform the one or more functions. Similarly, the means described above may comprise one or more circuits configured to implement the functionality of the means. For example, FIG. 9 illustrates an aspect of the wireless node 902 comprising a circuit for allocating 904 and a circuit for transmitting 910. The circuit for allocating 904 may be configured to allocate a contention free time period to an apparatus. The circuit for transmitting 910 may be configured to transmit during the allocated time period, a control communication to an apparatus, the control communication comprising a channel time request or grant. The aspect of the wireless node 902 illustrated in FIG. 9 also comprises the antenna 916, described above with respect to FIG. 2, connected to the circuit for transmitting 910. In some aspects, the antenna 916 is omitted. In some aspects, one or more of the components illustrated in FIG. 2 may be incorporated into the aspect of the wireless node 902 illustrated in FIG. 9.

Figure 10:
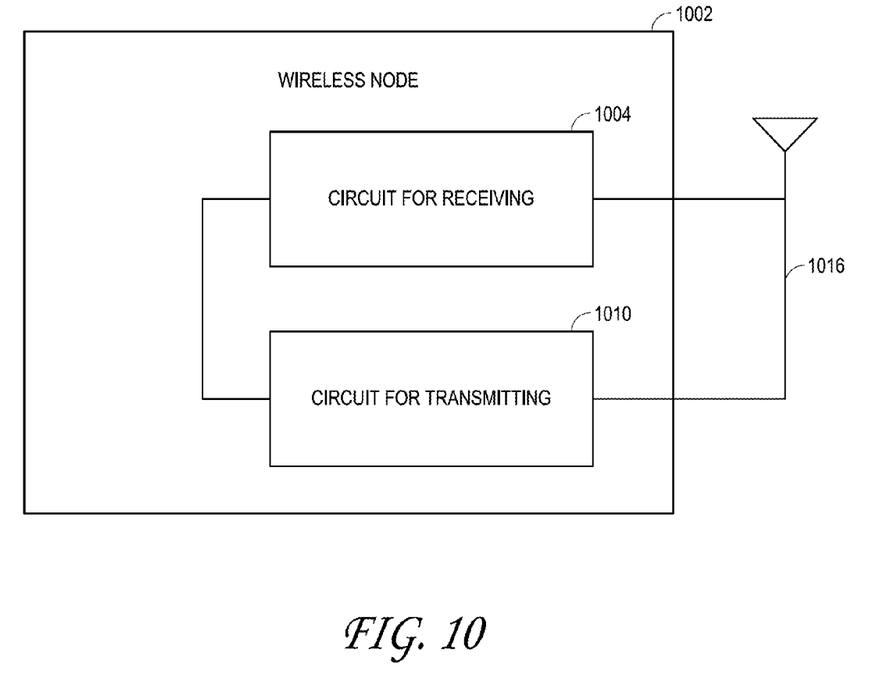
FIG. 10 illustrates an aspect of another apparatus for use in the communication system illustrated in FIG. 1.

As another example, FIG. 10 illustrates an aspect of the wireless node 1002 comprising a circuit for receiving 1012 and a circuit for transmitting 1010. The circuit for receiving 1012 may be configured to receive an allocation communication comprising an indication of an allocated time period. The circuit for transmitting 1010 may be configured to transmit during the allocated time period, a control communication to an apparatus, the control communication comprising a channel time request. The aspect of the wireless node 1010 illustrated in FIG. 10 also comprises the antenna 1016, described above with respect to FIG. 2, connected to the circuit for receiving 1012 and the circuit for transmitting 1010. In some aspects, the antenna 1016 is omitted. In some aspects, one or more of the components illustrated in FIG. 2 may be incorporated into the aspect of the wireless node 1002 illustrated in FIG. 10.

Those skilled in the art will recognize how best to implement the described functionality presented throughout this disclosure depending on the particular application and the overall design constraints imposed on the overall system.

It is understood that any specific order or hierarchy of steps described in the context of a software module is being presented to provide an examples of a wireless node. Based upon design preferences, it is understood that the specific order or hierarchy of steps may be rearranged while remaining within the scope of the invention.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communication, the method comprising:
allocating, by a first apparatus, a first contention free time period to a second apparatus; and
receiving, by the first apparatus, during the first contention free time period, a first control communication from the second apparatus, wherein the first control communication comprises a channel time request and an indication of a beam direction.

2. The method of claim 1, further comprising receiving, by the first apparatus, an indication of a beam direction from the second apparatus before allocating the first contention free time period, wherein the first control communication is received in the indicated beam direction.

3. The method of claim 1, further comprising:
allocating, by the first apparatus, a second contention free time period to the second apparatus; and
transmitting, by the first apparatus, during the second contention free time period, a second control communication to the second apparatus using the indicated beam direction, wherein the second control communication comprises a channel time grant.

4. The method of claim 3, wherein the indicated beam direction is a preferred beam direction for the second apparatus.

5. The method of claim 3, wherein the indicated beam direction comprises a plurality of beam directions.

6. The method of claim 3, wherein the second control communication further comprises a communication schedule for at least the second apparatus.

7. The method of claim 1, further comprising transmitting, by the first apparatus, a beacon to at least the second apparatus, wherein the beacon comprises an indication of the first contention free time period.

8. The method of claim 3, further comprising transmitting, by the first apparatus, a beacon to at least the second apparatus, wherein the beacon comprises an indication of the first contention free time period and the second contention free time period.

9. The method of claim 1, wherein the first control communication is received via a plurality of beam directions.

10. The method of claim 1, further comprising allocating, by the first apparatus, a third contention free time period to a third apparatus and receiving, by the first apparatus, during the third contention free time period, a third control communication from the third apparatus, wherein the third control communication comprises a channel time request and wherein the first contention free time period and the third contention free time period overlap.

11. The method of claim 1, further comprising allocating, by the first apparatus, a third contention free time period to a third apparatus and receiving, by the first apparatus, during the third contention free time period, a third control communication from the third apparatus, wherein the third control communication comprises a channel time request and wherein the first control communication and the third control communication are encoded with different Golay codes.

12. The method of claim 1, further comprising allocating, by the first apparatus, a third contention free time period to a third apparatus and receiving, by the first apparatus, during the third contention free time period, a third control communication from the third apparatus, wherein the third control communication comprises a channel time request and wherein the first control communication and the third control communication are spread with different spreading sequences.

13. A first apparatus for communication, the first apparatus comprising:
a processing system configured to allocate a first contention free time period to a second apparatus; and
a receiver configured to receive, during the first contention free time period, a first control communication from the second apparatus, wherein the first control communication comprises a channel time request and an indication of a beam direction.

14. The first apparatus of claim 13, wherein the receiver is further configured to receive an indication of a beam direction from the second apparatus before the processing system allocates the first contention free time period and wherein the first control communication is received in the indicated beam direction.

15. The first apparatus of claim 13, further comprising:
a transmitter;
wherein the processing system is further configured to allocate a second contention free time period to the second apparatus; and
wherein the transmitter is configured to transmit, during the second contention free time period, a second control communication to the second apparatus using the indicated beam direction, wherein the second control communication comprises a channel time grant.

16. The first apparatus of claim 15, wherein the indicated beam direction is a preferred beam direction for the second apparatus.

17. The first apparatus of claim 15, wherein the indicated beam direction comprises a plurality of beam directions.

18. The first apparatus of claim 15, wherein the second control communication further comprises a communication schedule for at least the second apparatus.

19. The first apparatus of claim 13, wherein the transmitter is further configured to transmit a beacon to at least the second apparatus, wherein the beacon comprises an indication of the first contention free time period.

20. The first apparatus of claim 15, wherein the transmitter is further configured to transmit a beacon to at least the second apparatus, wherein the beacon comprises an indication of the first contention free time period and the second contention free time period.

21. The first apparatus of claim 13, wherein the first control communication is received via a plurality of beam directions.

22. The first apparatus of claim 13, wherein the processing system is further configured to allocate a third contention free time period to a third apparatus and the receiver is configured to receive, during the third contention free time period, a third control communication from the third apparatus, wherein the third control communication comprises a channel time request and wherein the first contention free lime period and the third contention free time period overlap.

23. The first apparatus of claim 13, wherein the processing system is further configured to allocate a third contention free time period to a third apparatus and the receiver is further configured to receive, during the third contention free time period, a third control communication from the third apparatus, wherein the third control communication comprises a channel time request and wherein the first control communication and the third control communication are encoded with different Golay codes.

24. The first apparatus of claim 13, wherein the processing system is further configured to allocate a third contention free time period to a third apparatus and the receiver is further configured to receive, during the third contention free time period, a third control communication from the third apparatus, wherein the third control communication comprises a channel time request and wherein the first control communication and the third control communication are spread with different spreading sequences.

25. A first apparatus for communication, the first apparatus comprising:
means for allocating a first contention free time period to a second apparatus; and
means for receiving, during the first contention free time period, a first control communication from the second apparatus, wherein the first control communication comprises a channel time request and an indication of a beam direction.

26. The first apparatus of claim 25, wherein the means for receiving receives an indication of a beam direction from the second apparatus before the means for allocating allocates the first contention free time period and wherein the first control communication is received in the indicated beam direction.

27. The first apparatus of claim 25, wherein the means for allocating is configured to allocate a second contention free time period to the second apparatus, further comprising means for transmitting, during the second contention free time period, a second control communication to the second apparatus using the indicated beam direction, wherein the second control communication comprises a channel time grant.

28. The first apparatus of claim 27, wherein the indicated beam direction is a preferred beam direction for the second apparatus.

29. The first apparatus of claim 27, wherein the indicated beam direction comprises a plurality of beam directions.

30. The first apparatus of claim 27, wherein the second control communication further comprises a communication schedule for at least the second apparatus.

31. The first apparatus of claim 25, further comprising means for transmitting a beacon to at least the second apparatus, where in the beacon comprises an indication of the first contention free time period.

32. The first apparatus of claim 27, wherein the means for transmitting is configured to transmit a beacon to at least the second apparatus, wherein the beacon comprises an indication of the first contention free time period and the second contention free time period.

33. The first apparatus of claim 27, wherein the control communication is received via a plurality of beam directions.

34. The first apparatus of claim 25, wherein the means for allocating is configured to allocate a third contention free time period to a third apparatus and the means for receiving is configured to receive, during the third contention free time period, a third control communication from the third apparatus, wherein the third control communication comprises a channel time request and wherein the first contention free time period and the third contention free time period overlap.

35. The first apparatus of claim 25, wherein the means for allocating IS configured to allocate a third contention free time period to a third apparatus and the means for receiving is configured to receive, during the third contention free time period, a third control communication from the third apparatus, wherein the third control communication comprises a channel time request and wherein the first control communication and the third control communication are encoded with different Golay codes.

36. The first apparatus of claim 25, wherein the means for allocating is configured to allocate a third contention free time period to a third apparatus and the means for receiving is configured to receive, during the third contention free time period, a third control communication from the third apparatus, wherein the third control communication comprises a channel time request and wherein the first control communication and the third control communication are spread with different spreading sequences.

37. A computer program product for communication comprising a non-transitory computer-readable medium comprising instructions that when executed cause a first apparatus to:
  allocate a contention free time period to a second apparatus; and
  receive, during the contention free time period, a control communication from the second apparatus, wherein the control communication comprises a channel time request and an indication of a beam direction.

38. An access point comprising:
  a processing system configured to allocate a contention free time period to an apparatus;
  at least one antenna; and
  a receiver configured to receive, via the at least one antenna and during the contention free time period, a control communication from the apparatus, wherein the control communication comprises a channel time request, and wherein the first control comprises an indication of a beam direction.

* * * * *